R. R. SMILEY.
COUPLING FOR CABLES.
APPLICATION FILED OCT. 27, 1919.

1,355,857. Patented Oct. 19, 1920.

Witness:
J. P. Britt

Inventor:
R. R. Smiley
By Young & Young
Attorneys

UNITED STATES PATENT OFFICE.

ROBERT R. SMILEY, OF GOODMAN, WISCONSIN.

COUPLING FOR CABLES.

1,355,857.   Specification of Letters Patent.   Patented Oct. 19, 1920.

Application filed October 27, 1919. Serial No. 333,801.

*To all whom it may concern:*

Be it known that I, ROBERT R. SMILEY, a citizen of the United States, and resident of Goodman, in the county of Marinette and State of Wisconsin, have invented certain new and useful Improvements in Couplings for Cables; and I do hereby declare that the following is a full, clear, and exact description thereof.

My invention relates to new and useful improvements in couplings for cables and the like and is more particularly directed to the provision of a coupling for the ends of a conveyer cable adapted to travel about wheels at the ends of the conveyer stretch.

It is in general the object of my invention to simplify and otherwise improve the construction of couplings of this character and to increase the convenience of assembling and disassembling the connections afforded thereby.

It is more particularly my object to provide a coupling of this character wherein the cable engaging portions thereof are relatively movable to relieve stresses incidental to travel of the coupling about the periphery of a sprocket or other wheel.

It is further my object to provide a coupling of this character wherein the cable end engaging portions thereof may be most readily connected and disconnected.

With the above and other objects and advantages in view, which will be apparent as the description proceeds, my invention resides in the novel features of construction, combination and arrangement of parts which will be hereinafter more particularly described and defined by the appended claims.

Figure 1:
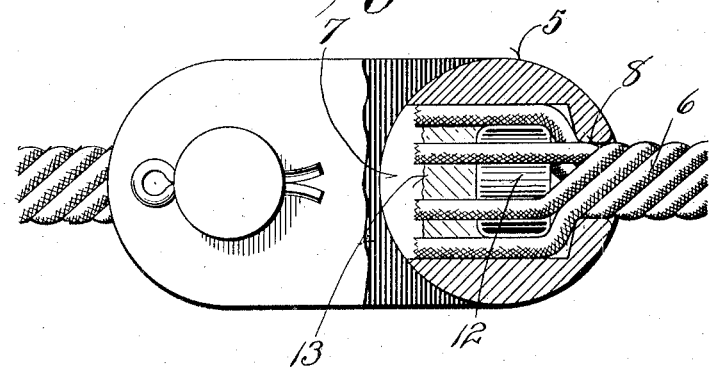
Figure 1 is a view partly in side elevation and partly in section of a coupling embodying my invention.
Figure 2:
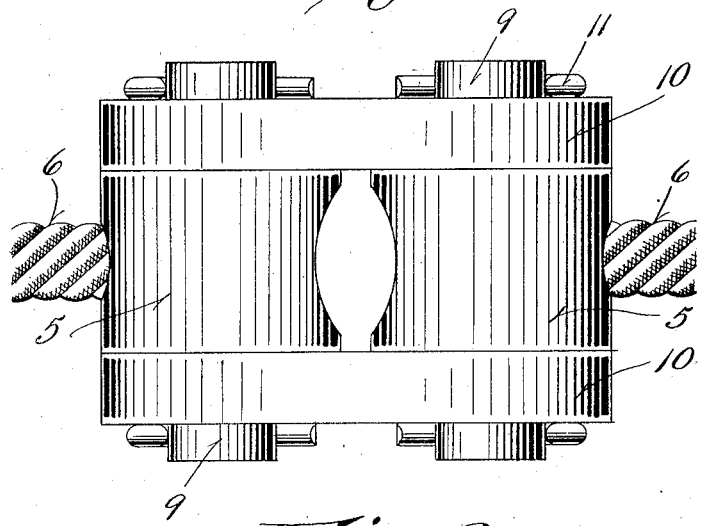
Fig. 2 is a top plan view of the coupling.
Figure 3:
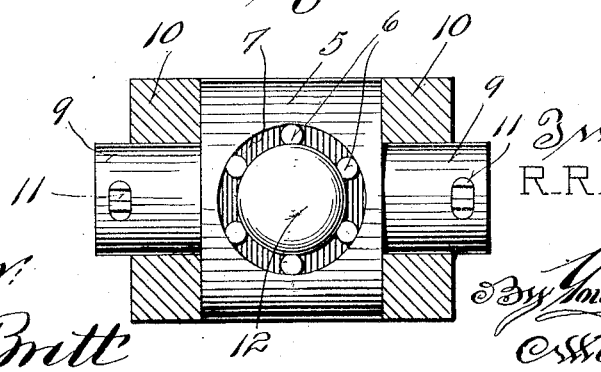
Fig. 3 is a transverse sectional view through the coupling.

Referring now more particularly to the accompanying drawings, my improved coupling comprises a pair of securing members 5 for the ends 6 of a cable, each of these coupling members comprising a cylindrical block having a well 7 sunk in one side thereof and communicating with a restricted cable passage 8 opening at the other side of the securing block, said block being provided with a pair of pintles 9 which are engageable in the apertures of the adjacent ends of a pair of connecting links 10, said links being retained on the pintles by cotter pins 11 or other retaining means.

In mounting each cable end in its securing block 5, the cable end is partly unraveled and inserted through the opening 8, the unraveled strands of the cable extending through the major portion of the length of the well 7. A spreader block 12 is then inserted in the strands of the cable and pressed to the bottom of the well binding the strands against the bottom of the well. Spelter 13 is then poured into the well, thus procuring a practically homogeneous mass, which is firmly locked in the well.

I have thus provided a readily assembled and exceedingly simple and efficient coupling, which is particularly adapted for use in connecting the ends of a cable which is adapted to travel about a sprocket or other wheel whereby to provide a yielding action compensating for the peripheral curvature of the wheel, by reason of the pivotal connections of the securing members with the connecting links.

What is claimed is:

1. A cable coupling comprising a pair of cable securing members, each of said members having a pair of oppositely extending pintles projecting from its ends, and a pair of connecting links, one of said links being pivotally mounted on each pair of corresponding pintles of the members.

2. A cable coupling comprising a pair of cable securing members, one of said members having a well in one side communicating with a reduced cable passageway opening through the opposite side, a cable length having one end portion disposed through said passageway and unraveled within said well, a spreader block inserted into the well within the unraveled strands of the cable end to force the same outwardly and bind them against the side and end of said well, means for securely retaining the block in the well, and means for securing the other end of the cable length to the other cable securing member.

In testimony that I claim the foregoing I have hereunto set my hand at Goodman, in the county of Marinette and State of Wisconsin.

ROBERT R. SMILEY.